United States Patent Office 3,168,546
Patented Feb. 2, 1965

3,168,546
ORGANIC AMMONIUM SULFITE ESTER COMPOUNDS AND METHOD OF PREPARATION
Albert Ballauf, Cologne-Stammheim, Werner Blank, Dormagen, Dietrich Glabisch, Leverkusen, and Martin Wandel, Dormagen, Germany, assignors to Farbenfabriken Bayer Aktiengesellschaft, Leverkusen, Germany, a corporation of Germany
No Drawing. Filed Dec. 29, 1960, Ser. No. 79,139
Claims priority, application Germany, Jan. 7, 1960, F 30,242, F 30,243; Apr. 29, 1960, F 31,120; Sept. 1, 1960, F 32,017
5 Claims. (Cl. 260—456)

The present invention relates to organic ammonium compounds, to processes of producing the same, and to the use of the organic ammonium compounds as agents for the prevention of electrostatic charges on synthetic high polymers.

The organic ammonium compounds of the present invention correspond to the general formula (I)
$$R_1 - \overset{R_2}{\underset{R_3}{\overset{\oplus}{N}}} - R_4 - OSO_2^{\ominus}$$

wherein $R_1$ denotes a hydrocarbon radical and $R_2$ and $R_3$ denote independently from each other hydrogen and/or hydrocarbon radicals and wherein two of the radicals $R_1$, $R_2$ or $R_3$ may be linked with one another with the formation of a heterocyclic ring, whilst $R_4$ denotes an alkylene radical. The hydrocarbon radicals standing for $R_1$, $R_2$ and $R_3$ may carry substituents, particularly free, etherified and/or esterified hydroxyl groups and/or carbocyclic and/or heterocyclic radicals. For example, they may be alkyl radicals containing up to 18 carbon atoms, hydroxyalkyl radicals containing up to 18 carbon atoms, radicals having the formula $H(OCH_2CH_2)_n-$ in which $n$ is an integer from 1 to 7, cyclohexyl and benzyl. The alkylene radical standing for $R_4$ may likewise carry substituents, particularly alkyl, hydroxyalkyl or aryl radicals.

Organic ammonium compounds of the general Formula I can be obtained by reacting organic amines with epoxides and sulfur dioxide in equimolecular quantities.

As organic amines, primary, secondary or tertiary amines may be taken into consideration, especially those of the aliphatic or cycloaliphatic series, such as propylamine, butylamine, hexylamine, dodecylamine, octadecylamine, ethylmethylamine, propylethylamine, dodecylmethylamine, dodecylethylamine, octadecylmethylamine, octadecylpropylamine, trimethylamine, triethylamine, tributylamine, ethyldimethylamine, diethylmethylamine, isopropyldimethylamine, butylethylmethylamine, dodecyldimethylamine, octadecyldimethylamine, octadecyldiethylamine, cyclohexyldimethylamine, benzyldimethylamine, ethanolamine, diethanolamine, triethanolamine, dimethylethanolamine, diethylethanolamine, dipropylethanolamine, cyclohexylethylethanolamine, benzylmethylethanolamine, methyldiethanolamine, hexyldiethanolamine, oleyldiethanolamine, benzyldiethanolamine, ethylmethylpropanolamine, ethylmethylisopropanolamine, the esters of alkanolamines and carboxylic acids, preferably higher fatty acids such as stearic acid and oleic acid, the ethers of alkanolamines and monovalent or polyvalent alcohols such as methanol, ethylene glycol or polyethylene glycol, furthermore peralkylated polyalkylene polyamines such as permethylated triethylenetetramine, 2-(dimethylaminomethylene)-tetrahydrofuran, 2-(ethylmethylaminomethylene)-tetrahydrofuran, piperidine, N-methylpiperidine, N-ethylpiperazine, N-methylmorpholine and N-ethylmorpholine.

As epoxides there may be mentioned for instance ethylene oxide, propylene oxide, glycide

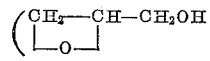

also known as glycidol, epihydric alcohol, and 2,3-epoxy-1-propanol) and styrene oxide.

The reaction can be carried out in the absence or presence of inert solvents such as water, dioxane or methylene chloride.

If ethylene oxide is to be used as epoxide there may also be employed instead of the mixture of ethylene oxide and sulfur dioxide, the addition product of ethylene oxide and sulfur dioxide. In this case it is advisable to carry out the reaction with the amine in the absence of solvents or in the presence of inert organic solvents such as dioxane or methylene chloride at temperatures of about $-20°$ C. to $+10°$ C.

If tertiary amines are to be used for the production of organic ammonium compounds having the foregoing general Formula I, the reaction may also be carried out by means of glycol sulfites instead of epoxides and sulfur dioxide. The reaction then takes place according to the following scheme:

(II) 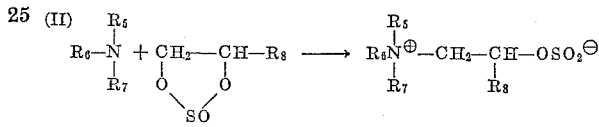

wherein $R_5$, $R_6$ and $R_7$ denote hydrocarbon radicals, particularly alkyl radicals which may carry substituents, especially free, etherified and/or esterified hydroxyl groups and/or carbocyclic and/or heterocyclic radicals, and wherein two of the radicals $R_5$, $R_6$ and $R_7$ may be linked with one another with the formation of a heterocyclic ring, whilst $R_8$ stands for hydrogen, an alkyl radical or an aryl radical. The reaction proceeds smoothly at elevated temperature, preferably at temperatures above $100°$ C., giving an excellent, often quantitative yield; it may be carried out in the presence or absence of inert solvents.

The organic ammonium compounds of the present invention possess a number of useful properties: they can be used with advantage, for example, as the reducing component of a redox system in the polymerization of unsaturated compounds, they can also be employed as emulsifiers, as dispersing agents of fillers in the processing of natural and synthetic rubber or as disinfectants.

The organic ammonium compounds of the invention are especially useful as agents for the prevention of electrostatic charges on synthetic high polymers. They may be applied to synthetic high polymers, for example, fibres, filaments, fabrics, foils or powders formed of such synthetic polymeric substances as polyamides, polyesters, polyacrylonitrile or polyvinyl chloride, in conventional manner, for example, by spraying or impregating the materials to be treated with solutions of the compounds in water or organic solvents. The requisite amounts can easily be ascertained by preliminary experiments; further details of such methods are described in the examples that follow hereinafter.

The organic ammonium compounds of the present invention differ from previously known agents which have already been proposed for the prevention of electrostatic charges on synthetic high polymers by a surprisingly superior effect. It is further noteworthy that in many cases fibres, filaments or fabrics treated with the compounds of the present invention have a soft full feel.

The following examples serve to illustrate the invention without, however, limiting its scope; the parts indicated are to be understood to be parts by weight and the analytical values specified to be understood to be percentages by weight.

Example 1

Into a suspension of 217 parts of dodecyldimethylamine and 400 parts of water there is introduced with vigorous stirring a gaseous mixture of 44 parts of ethylene oxide and 64 parts of sulfur dioxide. The reaction mixture thereby warms up in a short time to 75° C. The clear aqueous solution obtained within about 1 hour forms, upon cooling, a paste which is soluble in a sodium carbonate solution without cloudiness and has a strong reducing and foaming action.

Example 2

Into 8530 parts of dodecyldimethylamine cooled to −20° C. there is slowly added dropwise an addition product prepared from 1760 parts of ethylene oxide and 2560 parts of sulfur dioxide in such a manner that the temperature of the reaction product does not rise above −5° C. As the reaction proceeds, a thickening of the initially liquid reaction mixture takes place. When the entire specified quantity of the addition product has been added dropwise, the mixture is stirred for so long until a paste is formed. The resultant ammonium compound dissolves in water to form a clear solution that shows no cloudiness upon the addition of a sodium hydroxide or sodium carbonate solution. Potassium permanganate solutions and bromine water are discolored (reduced and bleached) by the reaction product. The following analysis was obtained for the product, which corresponds to that of a compound having the following formula

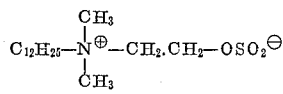

($C_{16}H_{35}O_3NS$, molecular weight 321): Calculated C, 59.8; H, 10.9; N, 4.3; S, 9.9. Found: C, 59.1; H,11.2; N, 4.2; S, 9.5

When under the same conditions 48 parts of palm kernal oil dimethyl amine or 35 parts of N-cyclohexyl-N-ethylethanolamine are reacted with 22 parts of the addition product of ethylene oxide and sulfur dioxide, paste-like ammonium compounds are obtained whose aqueous solutions show no cloudiness upon the addition of a sodium hydroxide or sodium carbonate solution and discolor (bleach) solutions of potassium permanganate and bromine water.

Example 3

To a solution of 64 parts of cyclohexyldimethylamine in 150 parts of methylene chloride there is added a solution of 56 parts of the addition product of ethylene oxide and sulfur dioxide in 150 parts of methylene chloride at 0° C. The ammonium compound obtained after evaporating the solvent dissolves clearly in water and is not precipitated by alkalies.

Example 4

104 parts of propylene oxide are slowly added dropwise at −15° C. to 115 parts of liquid sulfur dioxide, and subsequently a solution of 509 parts of stearylmethylamine in 2000 parts of methylene chloride. The temperature rises to +20° C. The resultant clear yellow-green solution is stirred for a further 12 hours and the solvent then distilled off at 50–60° C. in a vacuum. 513 parts of a pale brown, soap-like substance are thus obtained which forms clear strongly foaming solutions when dissolved in dilute acid, alkalies and water. The substance corresponds to the formula

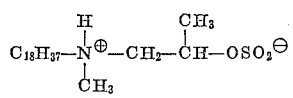

and gave the following analysis that agrees as shown with that of a compound having the empirical formula $C_{22}H_{47}O_3NS$ (molecular weight 405): Calculated C, 65.20; H, 11.60; N, 3.46; S, 7.90. Found C, 65.07, 65.08; H, 11.73, 11.97; N, 3.82; S, 7.75.

Example 5

Into a mixture of 88 parts of ethylene oxide and 128 parts of sulfur dioxide there is introduced dropwise with stirring at −5° C. to +5° C. a solution of 392 parts of dodecylamine in a mixture of 1000 parts of acetic acid ethyl ester (ethyl acetate) and 100 parts of methanol. The temperature of the reaction mixture is then allowed to rise to room temperature and the mixture then stirred for another 12 hours. After distilling off the solvent at 50° C. in vacuo there remain 545 parts of a soap-like, strongly reducing substance which corresponds to the formula

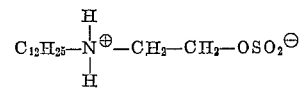

and gave the following analysis that agrees as shown with that of a compound having the empirical formula $C_{14}H_{31}O_3NS$ (molecular weight 293): Calculated N, 4.95; S, 10.93. Found N, 5.14; S, 10.7.

Example 6

55 parts of the addition product of ethylene oxide and sulfur dioxide are diluted at −10° C. with 390 parts of methylene chloride and treated dropwise with 176 parts of hydroxyethylated triethanolamine having a molecular weight of 347 at −5° C. to +5° C., while stirring. The clear solution formed in a weakly exothermic reaction is then stirred at room temperature for a further 12 hours. After distilling off the methylene chloride in vacuo at 50° C., 200 parts of a water-soluble, non-foaming substance are obtained whose aqueous solutions produce no cloudiness upon addition of acids and alkalies, and strongly reduce potassium permanganate. The substance corresponds to the formula

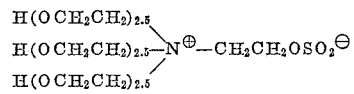

and gave the following analysis that agrees as shown with that of a compound having the empirical formula $C_{17}H_{37}O_{10.5}SN$ (molecular weight 455): Calculated N, 3.08; S, 7.04; Found N, 3.35; S, 7.1.

Example 7

108 parts of glycol sulfite are added dropwise with moderate stirring at 140° C. within ½ hour to 213 parts of dodecyldimethylamine. After cooling to room temperature, there are obtained 320 parts of a solid, almost colorless, soap-like substance which dissolves in water with a strong formation of foam and reduces potassium permanganate and gave the following analytical values which agree as shown with those of a compound having the empirical formula $C_{16}H_{35}O_3NS$ (molecular weight 321): Calculated C, 59.8; H, 10.9; N, 4.36. Found C, 59.5, 59.2; H, 11.1, 11.2; N, 4.06, 4.07.

Example 8

Under the reaction conditions of Example 7 there are obtained from 149 parts of triethanolamine and 108 parts of glycol sulfite, 250 parts of a highly viscous oil which is soluble in water and has reducing properties. Its analysis, which agrees as shown with that of a compound having the empirical formula $C_8H_{19}O_6NS$ (molecular weight 257), is as follows: Calculated C, 47.4; H, 7.38; N, 5.44. Found C, 37.8, 37.7; H, 7.4, 7.7; N, 5.35.

If the organic ammonium compounds produced according to the preceding examples are to be used as redox components in the polymerization of acrylonitrile, the process may be carried out as follows: A vessel from which air has been expelled by nitrogen, is filled with 256 parts of distilled water, 1.3 parts of 1 N sulfuric acid, 19 parts of acrylonitrile, 1 part of acrylic acid methyl ester and 16 parts of a 0.2-molar aqueous solution of one of the organic ammonium compounds and 8 parts of a 0.2-molar aqueous potassium peroxide disulfate solution. After closing the vessel, the reaction mixture is shaken at 50° C. for 3 hours. A white polymer having a uniform and fine grain is obtained (in a yield of 93%) which can very easily be filtered and dried.

*Example 9*

Polyamide fibres formed from ε-caprolactam are treated at 20° C. for 10 minutes at a fibre-to-liquid ratio of 1:30 with an aqueous solution which contains, per liter, 5 grams of the organic ammonium compound obtained according to Example 2. The fibres are then centrifuged to a wet weight increase of 50% and dried at 80° C. for an hour. The surface resistance of the fibres at 50% relative humidity has then decreased from $10^{12}\Omega$ to $3\times10^8\Omega$.

*Example 10*

Polyacrylonitrile fibres are treated in the same manner as described in Example 9 for polyamide fibres. The surface resistance of the polyacrylonitrile fibres at 50% relative humidity has then decreased from $10^{11}\Omega$ to $4\times10^7\Omega$.

*Example 11*

A fabric of polyacrylonitrile fibres is treated for 10 minutes at 20° C. at a fibre-to-liquid ratio of 1:20 with an aqueous solution which contains, per liter, 2 grams of the organic ammonium compound described hereinafter in this example. Thereupon the fabric is centrifuged to a weight increase of 50% and dried at 80° C. The surface resistance of the fabric at 50% relative humidity has then fallen from $10^{13}\Omega$ to $8\times10^8\Omega$.

The ammonium compound that was used which had the following formula

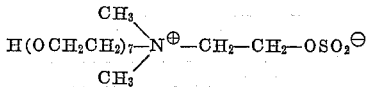

is prepared in the following manner:

Dimethylethanolamine is reacted with ethylene oxide in a molecular ratio of 1:6 and the resulting hydroxyethylated product then reacted with the addition product from ethylene oxide and sulfur dioxide as described in Example 2.

If the fabric is treated in the foregoing manner with an aqueous solution which contains, per liter, instead of 2 grams of the above mentioned ammonium compound, 5 grams of the ammonium compound prepared from oleyldiethanolamine and the addition compound from ethylene oxide and sulfur dioxide as described in Example 2 and having the formula

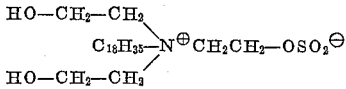

The fabric upon rubbing acquires a static charge of 10 volts, whereas untreated fabric upon rubbing acquires a charge of 50,000 volts.

*Example 12*

Polyamide fibres formed from ε-caprolactam are treated for 10 minutes at 20° C. in a goods-to-liquor ratio of 1:20 with an aqueous solution which contains, per liter, 10 grams of the organic ammonium compound described hereinafter in this example. The fibres are then centrifuged to a weight increase of 50% and dried at 80° C. for an hour. The surface resistance of the fibres at 50% relative humidity has then fallen from $10^{12}\Omega$ to $5\times10^8\Omega$.

The ammonium compound that was used which has the following formula

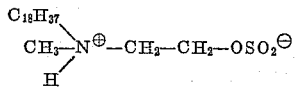

is prepared from stearylmethylamine and the addition product from ethylene oxide and sulfur dioxide as described in Example 3.

*Example 13*

A fabric of polyacrylonitrile fibres is treated on a fulling mill at room temperature with an aqueous solution which contains, per liter, 5 grams of the organic ammonium compound described below. Thereupon the fabric is squeezed to a weight increase of 80% and dried on a tentering frame at 60–80° C. The surface resistance of the fabric at 50% relative humidity has then fallen from $10^{13}$ ohms to $<10^9$ ohms.

The ammonium compound that was used has the following formula

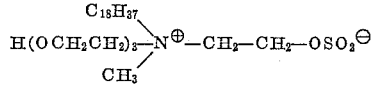

and is prepared in the following manner:

Stearylmethylamine is reacted with ethylene oxide in a molecular ratio of 1:3 and the resulting hydroxyethylated product reacted in ethanol with the addition product from ethylene oxide and sulfur dioxide as described in Example 3.

If the fabric is treated with an aqueous solution which contains, per liter, instead of the ammonium compound used in the foregoing example, 5 grams of the ammonium compound prepared from triethylamine and the addition product from ethylene oxide and sulfur dioxide as described in Example 2 and having the formula

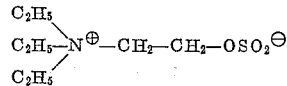

the surface resistance of the fabric at 50% relative humidity falls from $>10^{13}$ ohms to $4\times10^8$ ohms.

*Example 14*

Polyacrylonitrile fibres are sprayed by means of a spray gun with an aqueous solution which contains, per liter, 6 grams of the organic ammonium compound described hereinafter in this example; subsequently the fibres are dried at 80° C. and laid out at 50% relative humidity. With an application of 0.3% of the ammonium compound, referred to the weight of the fibre, it is already possible to reduce the surface resistance of the fibre from $10^{13}\Omega$ to $10^8\Omega$.

The ammonium compound that was used which has the following formula

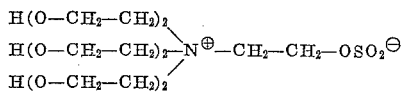

is prepared from tris-(2-hydroxyethoxyethyl)amine having the formula $(HO-CH_2CH_2-O-CH_2-CH_2)_3N$, ethylene oxide and sulfur dioxide as described in Example 2.

We claim:

1. An organic ammonium compound having the formula

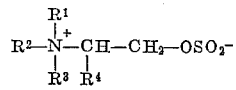

in which

R¹ is a member of the group consisting of alkyl members containing up to 18 carbon atoms, hydroxyalkyl members containing up to 18 carbon atoms, and members having the formula $H(OCH_2CH_2)_n$— in which $n$ is an integer from 1 to 7, cyclohexyl, and benzyl, $R^2$ and $R^3$ are each a member of the group consisting of hydrogen and the foregoing members represented by $R^1$, $R^4$ is a member of the group consisting of hydrogen, methyl, hydroxymethyl, and phenyl, and compounds having the foregoing formula in which the members $R^1$, $R^2$ and $R^3$ together with the nitrogen atom are a member of the group consisting of piperidino, piperazino, and morpholino.

2. An organic ammonium compound having the formula

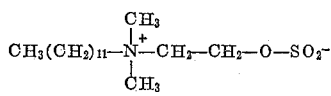

3. A process for the production of an organic ammonium compound having the formula

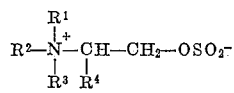

in which $R^1$ is a member of the group consisting of alkyl members containing up to 18 carbon atoms, hydroxyalkyl members containing up to 18 carbon atoms, and members having the formula $H(OCH_2CH_2)_n$— in which $n$ is an integer from 1 to 7, cyclohexyl, and benzyl, $R^2$ and $R^3$ are each a member of the group consisting of hydrogen and the foregoing members represented by $R^1$, $R^4$ is a member of the group consisting of hydrogen, methyl, hydroxymethyl, and phenyl, and compounds having the foregoing formula in which the members $R^1$, $R^2$ and $R^3$ together with the nitrogen atom are a member of the group consisting of piperidino, piperazino, and morpholino, which comprises (a) reacting at a temperature between —15° and 140° C.

(i) an amine having the formula

in which the members $R^1$, $R^2$ and $R^3$ have the foregoing significance, with (ii) a member of the group consisting of (ii/a) sulfur dioxide and an epoxy compound of the group consisting of ethylene oxide, propylene oxide, glycidol, and styrene oxide, (ii/b) addition compounds of equimolecular quantities of sulfur dioxide and an epoxy compound of the foregoing group (ii/a), and (ii/c) a glycol sulfite having the formula

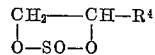

in which $R^4$ is a member of the group consisting of hydrogen, methyl, hydroxymethyl, and phenyl, and (b) subsequently recovering the resulting organic ammonium compound.

4. A process as defined in claim 3 in which the amine is reacted with an addition product of sulfur dioxide and an epoxy compound of the group ii/b defined in claim 3 at a temperature between about —20 and about +10° C.

5. A process as defined in claim 3 in which the amino compound is a tertiary amine, which is reacted with a glycol sulfite as defined in section ii/c of claim 3 at a temperature above 100° C.

References Cited in the file of this patent
UNITED STATES PATENTS

| | | |
|---|---|---|
| 2,129,264 | Downing | Sept. 6, 1938 |
| 2,628,176 | Simon et al. | Feb. 10, 1953 |
| 2,721,875 | Dickert et al. | Oct. 25, 1955 |
| 2,820,808 | Harris et al. | Jan. 21, 1958 |
| 2,955,960 | Batty et al. | Oct. 11, 1960 |

FOREIGN PATENTS

| | | |
|---|---|---|
| 795,417 | France | June 6, 1936 |
| 1,018,421 | Germany | Oct. 31, 1957 |

OTHER REFERENCES

Tsunoo: Ber. Deut. Chem., vol. 68, pp. 1334–1341 (1935).

Delepine: Comptes rend., vol. 212, pp. 83–86 (1941).